June 9, 1964 G. E. CARLSON 3,136,370
OUTBOARD MOTOR IMPELLER HUB
Filed Feb. 27, 1961 2 Sheets-Sheet 1

INVENTOR.
GEORGE E. CARLSON
BY
Everett J. Schroeder
ATTORNEY

June 9, 1964   G. E. CARLSON   3,136,370
OUTBOARD MOTOR IMPELLER HUB
Filed Feb. 27, 1961   2 Sheets-Sheet 2
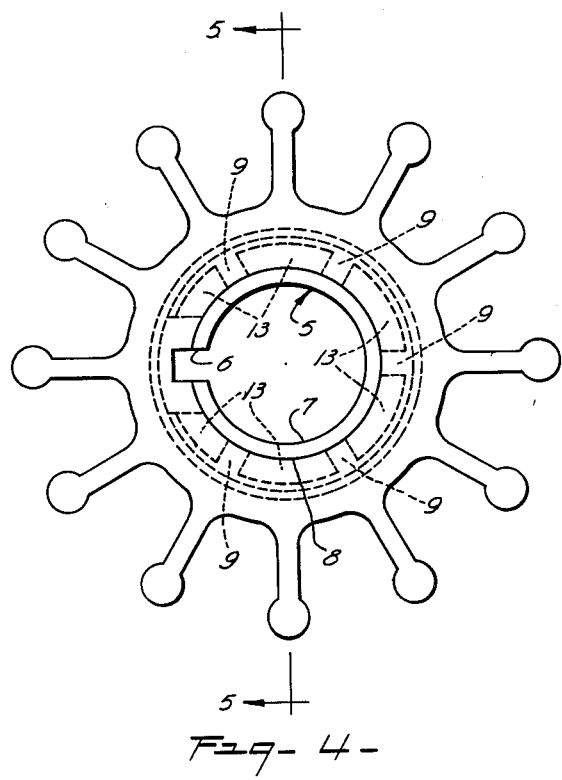
Fig- 4-
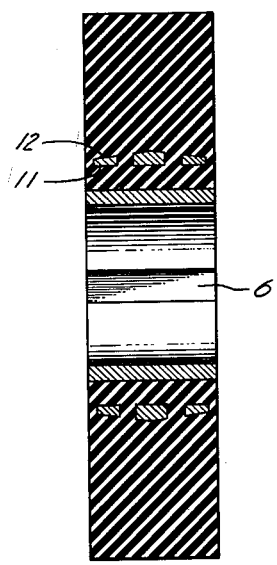
Fig- 5-
INVENTOR.
GEORGE E. CARLSON
BY
Everett J. Schroeder
ATTORNEY United States Patent Office 3,136,370
Patented June 9, 1964

3,136,370
OUTBOARD MOTOR IMPELLER HUB
George E. Carlson, Minneapolis, Minn., assignor to Minnesota Rubber Company, Minneapolis, Minn., a corporation of Minnesota
Filed Feb. 27, 1961, Ser. No. 91,974
8 Claims. (Cl. 170—173)

This invention relates to impellers. More particularly, it relates to an impeller hub for outboard motors.

The conventional outboard motor impeller consists of a plurality of rubber pump vanes molded around a brass hub. Such impellers are conventionally operated within a housing or sleeve made of aluminum or other metal foreign to brass. Brass hubs have heretofore conventionally been used because of the strength required in the hub and the difficulty in securing an adequate bond between the rubber and the hub if the latter were made of a different non-metal material.

Operation of the conventional impeller within a housing or a sleeve made of a foreign metal causes electrolysis of water within which the operation takes place to varying degrees, depending upon the nature of the water, and a consequence of such electrolysis is deterioration of the bond between the molded rubber and the brass hub. Slight deterioration of the molded rubber causes the same to loosen a bit and this, in turn, causes the molded rubber to rupture and break away from the hub, resulting in failure of the impeller. My invention is directed to overcoming this undesirable phenomena.

It is a general object of my invention to provide a novel and improved outboard motor impeller hub of simple and inexpensive construction and improved function.

A more specific object is to provide a novel and improved outboard motor impeller hub of very inexpensive manufacture, of adequate strength, and constructed of a material which will preclude damage to the bond between the rubber and the hub from electrolysis.

Another object is to provide a novel and improved outboard motor impeller hub uniquely designed and constructed of very inexpensive material which will not react with metal to cause electrolysis of water yet which is so constructed as to have adequate strength to preclude breaking of the hub under prolonged usage.

Another object is to provide a novel and improved outboard motor impeller hub constructed of a single integral part of extremely inexpensive material but designed to have great strength and to maintain its bond with the molded rubber throughout prolonged usage.

Another object is to provide a novel and improved outboard motor impeller hub constructed to have adequate strength and to avoid electrolysis of the water within which it operates, thereby avoiding deterioration of the bond between the hub and the molded rubber portion of the impeller.

These and other objects and advantages of this invention will more fully appear from the following description, made in connection with the accompanying drawings, wherein like reference characters refer to the same or similar parts throughout the several views and in which:

FIG. 4 is an end elevational view on a reduced scale of an impeller with the vanes molded upon my impeller hub; and FIG. 5 is a vertical sectional view taken along line 5—5 of FIG. 4.

Figure 1:
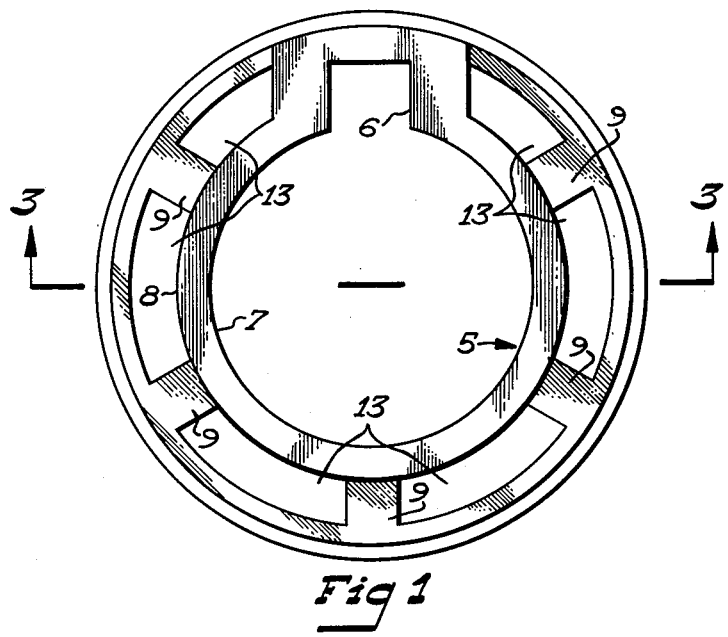
FIG. 1 is an end elevational view of one embodiment of my outboard motor impeller hub.
Figure 2:
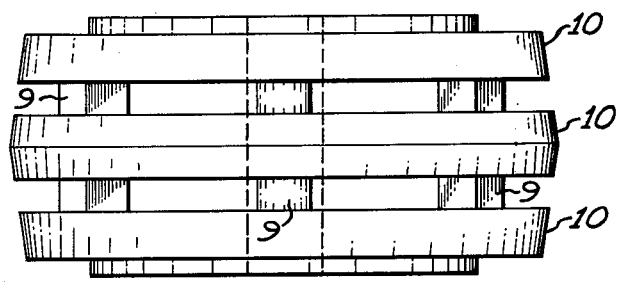
FIG. 2 is a top plan view of the same.
Figure 3:
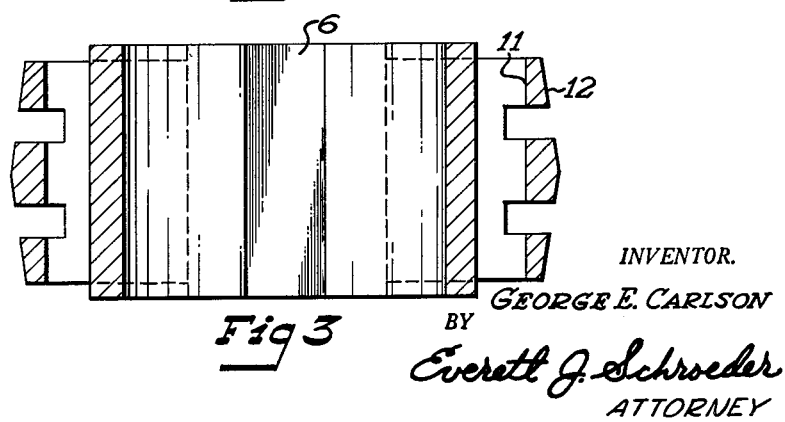
FIG. 3 is a horizontal sectional view of the same taken alyong line 3—3 of FIG. 1.

One embodiment of my invention, as shown in FIGS. 1–3, includes a rigid tubular member 5 having open ends and adapted to be connected to a rotary shaft (not shown) by a key (not shown) to fit into a keyway 6 formed in the inner wall of the tubular member. It will be noted that the tubular member 5 is thin walled and has a smooth inner surface 7 and a smooth outer surface 8. The keyway 6 extends axially of the tubular member. The wall of the tubular member 5 has a thickness preferably of approximately one-eighth inch.

Mounted on the exterior surface of the tubular member 5 and formed integrally therewith is a plurality of rigid circumferentially spaced axially extending support walls 9. These support walls, as best shown in FIG. 1, extend radially outwardly from the outer surface 8 of the tubular member 5 and, as best seen in FIG. 2, terminate short of the end of the tubular member 5.

Extending continuously and circumferentially around the support walls 9 is a plurality of equally spaced anchor rings 10. As best shown in FIGS. 2 and 3, there anchor rings 10 are axially spaced relative to each other and extend continuously around the walls 9 and are integrally formed therewith. It will be noted by reference to FIGS. 1 and 3 that the anchor rings 10 are radially spaced from the outer surface of the tubular member and are also spaced axially inwardly from the ends of that member. These anchor rings 10 are rigid and have flat inner surfaces 11 and flat outer surfaces 12. It will be noted that they are spaced axially inwardly from the ends of the tubular member 5. It will also be noted that the tubular member 5, the support walls 9 and the anchor rings 10 are integrally formed preferably of a rigid plastic material which will not react with metals to cause electrolysis of water.

It will be noted that the support walls 9 and the spaced anchor rings 10 cooperatively define axially extending openings 13 with the outer surface 8 of the tubular member 5. At the same time the axial spacing of the anchor rings 10 brings these openings 13 into communication with the area outside the anchor rings 10 so that the rubber vanes when molded to the hub will completely envelope the anchor rings 10 and a substantial body thereof will extend axially through the openings 13 to bond the vanes to the hub in an improved manner such that the impeller will operate throughout a much longer life span without failure of the rubber material. It will be noted that the rubber molds outside the outermost rings 10 so as to completely envelope them and perfect the seal at the outer end of the hub and for this purpose, the rings 10 have been disposed axially inwardly of the extreme outer end of the tubular member 5.

I have found that when the rubber portion of an impeller is molded to my improved outboard motor impeller hub, the resulting structure has a greatly increased life span. An outboard motor, impeller, when molded to my hub, yields a highly improved performance in contrast to impellers molded to brass hubs or hubs made of other metal. Moreover, I find that my impeller hub when constructed in accordance with my design, continues to function over prolonged periods without breakage of the same so as to perform equally satisfactorily with those which have been manufactured out of brass or other metals.

It will, of course, be understood that various changes may be made in the form, details, arrangement and proportions of the parts without departing from the scope of this invention which consists of the matter shown and described herein and set forth in the appended claims.

What is claimed is:

1. An outboard motor impeller comprising, a rigid tubular member having an outer surface and an unrestricted bore and being adapted to fixedly receive a rotary shaft within its bore for rotation therewith and including a plurality of rigid circumferentially spaced axially extending support elements extending radially outwardly from its outer surface and including a plurality of axially spaced rigid annular anchor elements extending continuously and circumferentially around said support elements in radially spaced relation to the outer surface of said tubular member and being disposed within the axial confines thereof, said tubular member, support elements and anchor elements being each integrally formed with the other, and a rubber outboard impeller body molded upon said outer surface and around said anchor elements and said support elements whereby said impeller body is firmly anchored to said tubular member.

2. An impeller hub comprising, a rigid imperforate open-ended tubular member having an unrestricted bore and being adapted to fixedly receive therewithin a rotary shaft for rotation therewith and having an outer circumferential surface, a plurality of rigid elongated support walls fixedly mounted directly on the outer circumferential surface of said tubular member in circumferentially spaced relation and at opposite sides thereof and extending axially thereof and radially outwardly from the outer surface thereof, and a plurality of rigid uninterrupted anchor rings fixedly mounted on said support walls in axially spaced positions relative to said tubular member and being disposed within the axial confines thereof, said anchor rings being spaced radially from the outer surface of said tubular member whereby an impeller molded around said tubular member and said support walls and said anchor rings will be more firmly anchored thereto.

3. The structure defined in claim 2 wherein said anchor rings are spaced axially inwardly of the ends of said tubular member.

4. The structure defined in claim 2 wherein said tubular member is thin walled and has a smooth outer surface.

5. The structure defined in claim 2 wherein said tubular member and said support walls and said anchor rings are all formed integrally.

6. The structure defined in claim 2 wherein each of said support walls terminate axially inwardly of the ends of said tubular member and said anchor rings are all spaced axially inwardly of the ends of said tubular member.

7. The structure defined in claim 2 wherein each of said anchor rings has flat inner and outer circumferential surfaces and is disconnected from the others except for said support walls.

8. The structure defined in claim 2 wherein said support walls extend axially throughout the major portion of the length of said tubular member but terminate short of the ends thereof.

References Cited in the file of this patent

UNITED STATES PATENTS

| | | |
|---|---|---|
| 1,636,492 | Taylor | July 19, 1927 |
| 1,686,142 | Bonsieur | Oct. 2, 1928 |
| 1,937,799 | Tarbox | Dec. 5, 1933 |
| 2,720,119 | Sherman | Oct. 11, 1955 |
| 2,869,651 | Rose | Jan. 20, 1959 |
| 2,908,223 | Buchi | Oct. 13, 1959 |
| 3,013,440 | White | Dec. 19, 1961 |

FOREIGN PATENTS

| | | |
|---|---|---|
| 581,224 | Great Britain | Oct. 4, 1946 |